(12) United States Patent
Tang et al.

(10) Patent No.: US 12,303,879 B1
(45) Date of Patent: May 20, 2025

(54) NANO-SUPPORTED SOLID-PHASE TITANIUM-BASED MULTI-METAL CATALYST, PREPARATION METHOD THEREFOR AND USE THEREOF

(71) Applicant: JIANGSU GUOWANG HIGH-TECHNIQUE FIBER CO., LTD., Suzhou (CN)

(72) Inventors: Junsong Tang, Suzhou (CN); Shuchang Bian, Suzhou (CN)

(73) Assignee: JIANGSU GUOWANG HIGH-TECHNIQUE FIBER CO., LTD., Suzhou (CN)

( * ) Notice: Subject to any disclaimer, the term of this patent is extended or adjusted under 35 U.S.C. 154(b) by 0 days.

(21) Appl. No.: 18/955,358

(22) Filed: Nov. 21, 2024

Related U.S. Application Data

(63) Continuation-in-part of application No. PCT/CN2024/093556, filed on May 16, 2024.

(30) Foreign Application Priority Data

Jan. 15, 2024 (CN) .......................... 202410050538.7

(51) Int. Cl.
| | | |
|---|---|---|
| B01J 37/00 | (2006.01) | |
| B01J 21/06 | (2006.01) | |
| B01J 35/45 | (2024.01) | |
| B01J 35/61 | (2024.01) | |
| B01J 37/03 | (2006.01) | |
| B01J 37/08 | (2006.01) | |
| C08G 63/183 | (2006.01) | |
| C08G 63/85 | (2006.01) | |

(52) U.S. Cl.
CPC .......... B01J 37/031 (2013.01); B01J 21/063 (2013.01); B01J 35/45 (2024.01); B01J 35/615 (2024.01); B01J 37/08 (2013.01); C08G 63/183 (2013.01); C08G 63/85 (2013.01)

(58) Field of Classification Search
None
See application file for complete search history.

(56) References Cited

U.S. PATENT DOCUMENTS

| | | | |
|---|---|---|---|
| 6,656,339 B2 * | 12/2003 | Talin | ........................ C25D 7/00 |
| | | | 205/333 |
| 2016/0296917 A1 * | 10/2016 | Bordoloi | ................ B01J 37/088 |
| 2019/0247841 A1 * | 8/2019 | Park | ........................ B05C 5/002 |
| 2023/0357499 A1 | 11/2023 | McCall | |

FOREIGN PATENT DOCUMENTS

| | | |
|---|---|---|
| CN | 1327879 A | 12/2001 |
| CN | 103342537 A | 10/2013 |
| CN | 105295014 A | 2/2016 |
| CN | 111057226 A | 4/2020 |
| CN | 117567730 A | 2/2024 |

* cited by examiner

*Primary Examiner* — Stefanie J Cohen
(74) *Attorney, Agent, or Firm* — Dinsmore & Shohl LLP

(57) ABSTRACT

A nano-supported solid-phase titanium-based multi-metal catalyst, a preparation method therefor and use thereof are provided. The catalyst comprises a carrier and an active component, the active component comprises a main active component and a secondary active component. The preparation method comprises the following steps: precipitating reaction a suspension of the carrier, a water-soluble scandium/magnesium/cobalt/zinc salt and a water-soluble hydroxide, filtering and heating treatment so that the carrier is loaded with the secondary active component; reacting a titanium source with an acid to obtain a reaction mixture; reacting the suspension of the carrier loaded with the secondary active component with the reaction mixture to obtain a catalyst precursor; and reacting the catalyst precursor with a silicate and water so that the carrier is loaded with the main active component. When used for polyester synthesis, the catalyst can inhibit the hydrolysis of titanium, significantly improve polymerization activity, inhibit the occurrence of side reactions.

16 Claims, No Drawings

NANO-SUPPORTED SOLID-PHASE TITANIUM-BASED MULTI-METAL CATALYST, PREPARATION METHOD THEREFOR AND USE THEREOF

CROSS-REFERENCE TO RELATED APPLICATIONS

This application is a Continuation-in-Part of PCT App. Serial No. PCT/CN2024/093556, having an International Filing Date of May 16, 2024, which claims the benefit of priority to Chinese Patent Application No. 202410050538.7 filed on Jan. 15, 2024, and the entire disclosure of both are hereby incorporated by reference.

TECHNICAL FIELD

The present disclosure relates to a nano-supported solid-phase titanium-based multi-metal catalyst, a preparation method therefor and use thereof.

BACKGROUND

In polyester synthesis reactions, titanium-based catalysts are widely used for their high efficiency in catalyzing esterification and polymerization reactions in synthesis of unsaturated polyesters and synthesis technology of poly(1,3-trimethylene terephthalate) (PTT), poly(butylene terephthalate) (PBT), polyethylene naphthalate (PEN), poly(butylene succinate) (PBS), thermoplastic biodegradable plastic copolymer of butylene adipate and butylene terephthalate (PBAT), and linear polyesters. The temperature range of the optimal, efficient and high-quality catalytic polymerization reaction of titanium-based catalyst is 175~265° C. Within this range, the level of side reactions in the catalytic polymerization process is low and the product quality is excellent. However, in the synthesis process of the most commonly used polyethylene terephthalate (PET) and modified polyesters thereof, the temperature for polymerization reaction is generally controlled to be within a range of 275° C. to 295° C. Within this temperature range, although titanium-based catalysts can still achieve more efficient catalytic reaction efficiency, the level of side reactions catalyzed by titanium-based catalysts also increases significantly. Because polyesters produce a large amount of cracking and unsaturated end groups, the hue of PET products is seriously deteriorated, affecting the appearance of the products.

At present, the commonly used catalysts for PET synthesis are antimony-based catalysts. The temperature range for the best catalytic effect of antimony-based catalysts is from 269° C. to 295° C. Within this range, the main reaction is PET polymerization reaction, and the level of side reactions is very low. Therefore, the antimony-based catalysts, such as antimony trioxide, antimony acetate, ethylene glycol antimony, are widely used in the polyester industry.

However, the antimony-based catalysts have the following obvious disadvantages: the metal antimony element in the antimony-based catalysts is a heavy metal. During the use in esterification, polymerization, spinning, manufacturing, printing and dyeing, and clothing, trace antimony elements will continue to dissolve into the environment, causing environmental pollution. The large-scale use of antimony-based catalysts may cause serious environmental pollution.

The earliest titanate catalysts are very unstable in catalytic effect on esterification and polymerization reactions because they are more prone to hydrolysis to generate a solid phase titanium dioxide. The titanate catalysts hydrolyzed by the esterification reaction will be deactivated, resulting in a significant increase in the level of subsequent side reactions. Although high-content phosphorus stabilizers can be used to seal the deactivated catalysts, the addition of a large amount of phosphorus stabilizers will also have a passivation effect on the activity of titanium-based catalysts added for polymerization, resulting in a decrease in catalytic activity.

Although the novel liquid-phase titanium-based catalysts developed by DuPont, Sachtleben, Johnson Matthey, etc. have solved the problem of catalyst hydrolysis to a certain extent, due to the high acidity of the catalysts, in their actual application in the spinning process, the catalysts produce a large viscosity drop, affecting the product quality; and the catalysts and phosphorus stabilizers produce precipitates in a polymerization section and a spinning manifold, and the pipelines and the manifold will be clogged after long-term operation. Therefore, the use effect of these catalysts is not ideal, and there are technical bottlenecks in large-scale promotion.

The citric acid/titanium-based catalysts of Johnson Matthey in the UK have completely solved the hydrolysis problem of titanium-based catalysts. However, for trifunctional citric acid, the acidity of the catalysts therefrom reaches a pH value of about 1.0, and the third carboxyl group of citric acid will participate in the polymerization reaction, thereby affecting the quality of polyester products to some extent. In addition, the liquid-phase catalysts mentioned above are not resistant to light and cannot be stored in sunlight for a long period of time. Ti—O—Ti bonds inside the catalysts produce a purple light change under light conditions, affecting the product color and catalytic effect.

That is, the titanium-based catalysts currently used for polyester synthesis cannot achieve good inhibition of hydrolysis, increase polymerization activity, inhibit the level of side reactions, and ensure the hue and other properties of products.

SUMMARY OF THE DISCLOSURE

An objective of the present disclosure is to provide a method for preparing a nano-supported solid-phase titanium-based multi-metal catalyst. The catalyst obtained by the preparation method can inhibit the hydrolysis of titanium during polymerization, significantly improve the polymerization activity during polyester synthesis, significantly inhibit the occurrence of side reactions, and also ensure excellent hue and other properties of a polyester product.

In order to achieve the above objective, a technical solution adopted by the present disclosure is as follows:

A method for preparing a nano-supported catalyst, the catalyst comprising a carrier and an active component, the active component comprising a main active component and a secondary active component, wherein the carrier is a silica-coated modified porous inorganic material; the preparation method comprising the following steps: precipitating reaction a suspension of the carrier, a water-soluble scandium salt, a water-soluble magnesium salt, a water-soluble cobalt salt, a water-soluble zinc salt and a water-soluble hydroxide. filtering and heating treatment so that the carrier is loaded with the secondary active component; reacting a titanium source with an acid to obtain a reaction mixture; reacting the suspension of the carrier loaded with the secondary active component with the reaction mixture to obtain a catalyst precursor; and reacting the catalyst precursor with a silicate and water so that the carrier is loaded with the main active component, thereby obtaining the nano-supported catalyst.

In the present disclosure, the "nano-supported" means that the catalyst is nano-sized and is a supported catalyst.

In the present disclosure, the main active component and the secondary active component are defined based on the level of catalytic activity. The main active component exerts main catalytic polymerization activity, and the secondary active component exerts secondary catalytic polymerization activity. Generally, the main active component can catalyze polymerization reactions alone, while the secondary active component cannot catalyze polymerization reactions alone. In the present disclosure, the titanium source refers to a compound containing titanium, and is used as a raw material for a titanium-containing active component in the catalyst.

In some embodiments, the porous inorganic material has a particle size of 20-70 nm and a specific surface area of 220-400 $m^2/g$.

In some embodiments, the porous inorganic material has a particle size of 25-40 nm and a specific surface area of 270-350 $m^2/g$.

In some embodiments, the nano-supported catalyst has a particle size of 80-160 nm.

In the present disclosure, the particle size is the data tested by the GB/T422082022 test standard; the specific surface area is the data tested by the GB/T386912020 test standard.

In some embodiments, the porous inorganic material is one or more of molecular sieve, sharp feldspar, nanoporous alumina, nanoporous alumina-zirconia, porous silica and nanoporous barium sulfate. The nanoporous barium sulfate may be prepared by reaction between sulfuric acid and barium hydroxide or barium acetate in an ethylene glycol liquid phase.

It was found through research that, on the carrier of the catalyst, an aqueous solution of four metal salts acting as the secondary active component and a water-soluble hydroxide have a precipitation reaction first, and the corresponding metal hydroxides are generated by coprecipitation, and the four metal hydroxides have specific lattice structures; then, most of the hydroxides are heated to generate corresponding oxides, and the oxides of the four metals also have specific crystal structures; the oxides of the four metals and a remaining small portion of the hydroxides not decomposed into oxides together form the secondary active component of the catalyst.

The titanium source, such as tetraisopropyl titanate, tetrabutyl titanate or titanium tetrachloride, first reacts with an acid to generate titanium tetrahydroxide. The silicate reacts with water to generate hydroxyl-containing silicon hydroxide. The titanium tetrahydroxide and the hydroxyl-containing silicon hydroxide undergo condensation reaction to generate a compound containing Ti—O—Si bonds. The compound contains titanium element as the main active component of the catalyst. Also, the compound does not contain hydroxyls, which can inhibit the hydrolysis of the catalyst when used to catalyze polyester polymerization, reduce the occurrence of side reactions during polymerization, and improve the hue of the polyester product.

The titanium tetrahydroxide and the small amount of undecomposed hydroxides of the four metals in the secondary active component will undergo condensation to some extent to form a certain bonding effect. In the catalyst of the present disclosure, the main active component and the secondary active component will have a synergistic effect to jointly improve the catalyst's hydrolysis inhibition, increase the catalytic activity, and inhibit the side reactions during polyester polymerization. And the catalyst of the present disclosure has a good dispersion effect in ethylene glycol.

In some embodiments, a mass ratio of the active component to the carrier is 11.3-25.0:75.0-88.7.

In some embodiments, a molar ratio of the main active component to the secondary active component is 3.3-10.0:8-15.

In some embodiments, a molar ratio of the water-soluble scandium salt to the water-soluble magnesium salt to the water-soluble cobalt salt to the water-soluble zinc salt is 0.1-3.0:0.5-2.5:0.1-1.0:0.5-3.0.

In some embodiments, the water-soluble scandium salt, the water-soluble magnesium salt, the water-soluble cobalt salt, and the water-soluble zinc salt are respectively selected from sulfates, acetates, or chlorides of the corresponding metal elements.

In some embodiments, the water-soluble hydroxide is sodium hydroxide and/or potassium hydroxide.

In some embodiments, the titanium source is one or more of tetraisopropyl titanate, tetrabutyl titanate, and titanium tetrachloride.

In some embodiments, the acid is one or more of formic acid, acetic acid, propionic acid, oxalic acid, malonic acid, succinic acid, citric acid, and polyphosphoric acid.

In some embodiments, the silicate is one or more of tetraethyl silicate, tetrabutyl silicate, and tetrapropyl silicate.

In some embodiments, a mass ratio of the titanium source to the acid is 1:0.5-2.0.

In some embodiments, a mass ratio of the silicate to the titanium source is 1:0.2-0.5.

In some embodiments, the water-soluble scandium salt, the water-soluble magnesium salt, the water-soluble cobalt salt, and the water-soluble zinc salt are added dropwise to the suspension of the carrier in the form of an aqueous solution; the water-soluble hydroxide is added dropwise to the suspension of the carrier in the form of an aqueous solution; and in the preparation method, the addition of the water-soluble scandium salt, the water-soluble magnesium salt, the water-soluble cobalt salt, and the water-soluble zinc salt is controlled to be simultaneous with the addition of the water-soluble hydroxide.

In some embodiments, the molar concentration of the water-soluble scandium salt in the aqueous solution is 0.1-3.0 mol/L.

In some embodiments, the molar concentration of the water-soluble magnesium salt in the aqueous solution is 0.5-2.5 mol/L.

In some embodiments, the molar concentration of the water-soluble cobalt salt in the aqueous solution is 0.1-1.0 mol/L.

In some embodiments, the molar concentration of the water-soluble zinc salt in the aqueous solution is 0.5-3.0 mol/L.

In some embodiments, the molar concentration of the water-soluble hydroxide in its aqueous solution is 0.1 to 2.0 mol/L.

In some embodiments, the precipitating reaction is carried out at a pH of 10-12.

In some embodiments, the precipitating reaction is carried out for 8-11 h.

In some embodiments, the precipitating reaction is carried out at a temperature of 70-130° C.

In some embodiments, the heating treatment is carried out at a temperature of 290-310° C.

In some embodiments, the heating treatment is carried out for 2-6 h.

In some embodiments, the preparation method comprises the following steps: 1) heating the suspension of the carrier to 60-90° C., adding a mixed aqueous solution of the water-soluble scandium salt, the water-soluble magnesium salt, the water-soluble cobalt salt and the water-soluble zinc salt and the aqueous solution of the water-soluble hydroxide dropwise to the suspension of the carrier under stirring for precipitation reaction, and after the addition, heating the suspension to 110-130° C. to continue the reaction, adjusting the pH to neutral, filtering, drying, heating treatment, and crushing so that the carrier is loaded with the secondary active component; 2) reacting the titanium source with the acid to obtain a reaction mixture; 3) dispersing the carrier loaded with the secondary active component in ethylene glycol, adding the reaction mixture dropwise to the ethylene glycol for reaction to obtain a catalyst precursor; and 4) adding the silicate and water to the catalyst precursor for reaction, and then removing the acid and water, thereby obtaining the nano-supported catalyst.

In some embodiments, the preparation method further comprises steps of dispersing the porous inorganic material in ethylene glycol or water, adding tetraethyl orthosilicate or sodium silicate and the aqueous solution of sodium hydroxide dropwise to the ethylene glycol or water for hydrolysis reaction, filtering and drying to obtain the carrier.

The present disclosure further provides a nano-supported catalyst prepared by the described method for preparing a nano-supported catalyst. The catalyst can inhibit the hydrolysis of titanium during polymerization, significantly improve the polymerization activity during polyester synthesis, significantly inhibit the occurrence of side reactions, and also ensure excellent hue and other properties of a polyester product.

The present disclosure further provides a use of the described nano-supported catalyst for catalyzing polyester synthesis.

In some embodiments, during the polyester synthesis, the nano-supported catalyst is used alone, or the nano-supported catalyst is used together with other catalysts. The nano-supported catalyst of the present disclosure can efficiently catalyze polyester synthesis alone. Of course, the nano-supported catalyst may also be used together with other catalysts used to catalyze polyester synthesis in the prior art, such as ordinary titanium-based catalysts and antimony-based catalysts.

In some embodiments, the polyester is one or more of polyethylene terephthalate, polytrimethylene terephthalate, polybutylene terephthalate, polyethylene naphthalate, and polybutylene succinate. The polymerization of polyethylene terephthalate occurs at a high temperature, and the catalyst of the present disclosure can catalyze the polymerization reaction efficiently. For other polyesters which are synthesized at a relatively low temperature, the catalyst of the present disclosure can also catalyze the polymerization efficiently.

Due to the application of the described technical solution, the present disclosure has the following advantages compared with the prior art:

The catalyst of the present disclosure uses a silica-coated modified porous inorganic material as a carrier, which can help improve the catalytic activity of the catalyst. Moreover, in the present disclosure, first, on the carrier of the catalyst, an aqueous solution of four metal salts acting as the secondary active component and a water-soluble hydroxide have a precipitation reaction, and the corresponding metal hydroxides are generated by coprecipitation, and the four metal hydroxides have specific lattice structures; then, most of the hydroxides are heated to generate corresponding oxides, and the oxides of the four metals also have specific crystal structures; the oxides of the four metals and a remaining small portion of the hydroxides not decomposed into oxides together form the secondary active component of the catalyst.

The main active component of the catalyst is a compound containing Ti—O—Si bonds with no hydroxyl, which can inhibit the hydrolysis of the catalyst when used to catalyze polyester polymerization, reduce the occurrence of side reactions during polymerization, and improve the hue of the polyester product.

Moreover, in the catalyst of the present disclosure, the main active component and the secondary active component will undergo a bonding reaction to produce a synergistic effect, thereby jointly improving hydrolysis inhibition of the catalyst, increasing the catalytic activity, and inhibiting the side reactions during polyester polymerization.

The solid-phase titanium-based multi-metal catalyst of the present disclosure is a porous solid-phase catalyst with a large specific surface area. The catalyst has a good dispersion effect in ethylene glycol, overcomes the disadvantage of conventional liquid-phase titanium-based catalysts that are prone to hydrolysis during the esterification polymerization process, has a very superior catalytic effect, and can effectively inhibit the level of side reactions. Compared with traditional antimony-based catalysts, this catalyst can ensure that the high-viscosity melt has better thermal stability and thermal oxygen stability. This catalyst can also ensure that the viscosity drop during melt transfer is reduced by about 12% to 18%, compared with the antimony-based catalysts.

When the catalyst of the present disclosure is used for polyester synthesis, the catalytic activity is improved, the polymerization time can be shortened, the occurrence of side reactions is inhibited, the hue of the polyester product is improved, and the spinning effect of the fiber is improved.

DETAILED DESCRIPTION OF EXEMPLARY EMBODIMENTS

The above solutions are further described in conjunction with specific embodiments below. It should be understood that these embodiments are used to illustrate the basic principles, main features and advantages of the disclosure, and the disclosure is not limited by the scope of the following embodiments. The implementation conditions used in the embodiments can be further adjusted according to specific requirements, and the implementation conditions not specified are usually the conditions in conventional experiments. In the following embodiments, unless otherwise specified, all raw materials are purchased from commercial sources or prepared by conventional methods in the art.

The above embodiments are only for illustrating the technical concept and features of the disclosure, and their purpose is to enable people familiar with this technology to understand the content of the disclosure and implement it accordingly, but not to limit the scope of the disclosure. Any equivalent changes or modifications made according to the spirit of the disclosure should fall within the scope of the disclosure.

Example 1

This example provides a nano-supported solid-phase titanium-based multi-metal catalyst, and uses the catalyst in the polymerization of PET. The specific steps are as follows:

Preparation of Catalyst

1) Ethylene glycol was heated to 50° C., and accurately measured barium hydroxide octahydrate was slowly added into a reactor (high-speed homogenizer) with high-speed (3000-6000 rpm) stirring; after the barium hydroxide octahydrate was completely dissolved, dilute sulfuric acid (equal molar ratio to the barium ion) with a mass concentration of 10% was then quickly added into the reactor, and high-speed stirring was continued for 1.0 h. The obtained suspension was heated up to about 90° C. by reaction heat, the pH of the suspension was adjusted to be stable at 7.0, the suspension was then heated to reflux, and then distilled to remove the water, and then cooled to 170° C.; ethylene glycol was added again and the mass content of barium sulfate powder was controlled to 20%; the suspension was then stirred for 0.5 h and measured for pH again until the pH was completely stable at 7.0. The obtained barium sulfate powder had a particle size of 20 nm and a specific surface area of 350 $m^2/g$.

2) Tetraethyl silicate and sodium hydroxide were added dropwise to the suspension of barium sulfate in ethylene glycol with a pH of 7.0, so that the surface of the barium sulfate powder was coated with a silicon dioxide layer; after aging for 6 h, a mixed aqueous solution of hydrated scandium sulfate, magnesium sulfate, cobalt acetate and zinc acetate (where the molar concentration of hydrated scandium sulfate was 2.5 mol/L, the molar concentration of magnesium sulfate was 0.5 mol/L, the molar concentration of cobalt acetate was 0.5 mol/L, and the molar concentration of zinc acetate was 0.5 mol/L), and an aqueous solution of sodium hydroxide with a molar concentration of 0.5 mol/L were simultaneously added dropwise into the reactor with high-speed stirring in an amount such that the total valence of the four metal ions was equal to the total valence of hydroxide ions, and the pH of the suspension was strictly controlled to be between 10.0 and 10.2 during the addition process.

Then, the reaction system was heated to 120° C. and aged for 5.0 h. The pH of the suspension was then adjusted to 7.0 with dilute sulfuric acid with a mass concentration of 10%. After being stirred for 1.0 h, the suspension was filtered and washed with distilled water by three times until the pH was neutral. The filtered powder was dried and then calcined at 290° C. in a muffle furnace for 4.0 h, and then cooled and crushed, and finally finely crushed with a jet mill until the particle size was 0.15 μm.

When the bottom of the reactor was cooled to 170° C., tetraisopropyl titanate and glacial acetic acid were mixed in a weight ratio of 1:0.5 to obtain a mixed solution. A certain amount of the mixed solution was then slowly added to the reactor. Then, the reaction system was aged for 1 h, and water and tetraethyl silicate were then simultaneously added to the reactor to cause a hydrolysis reaction, thereby modifying the catalyst by coating the catalyst with a silicon oxide layer. Then, the system was stirred to reflux at 80° C. for 6 h, and finally heated to 135° C. When a large amount of acetic acid-water was distilled off, ethylene glycol was added to the reactor, and heating was continued until the acetic acid was almost completely distilled off, and then vacuum purification was performed until the components distilled off such as acetic acid reached a specified amount, and the reaction system was then cooled to room temperature. The suspension was then ground to be ultrafine to obtain a suspension of the catalyst in ethylene glycol, with a solid content of 10% and a particle size of 85 nm. The catalyst included, in percent by weight, 83.4% of the carrier, 6.6% of the main active component in which the titanium content was 2.0%, and 10% of the secondary active component. In the secondary active component, the molar ratio of scandium to magnesium to cobalt to zinc was 5:1:1:1.

Polymerization of PET:

Pure terephthalic acid, ethylene glycol and the prepared suspension of the catalyst in ethylene glycol were added to a 70 L polymerization reactor for polymerization, where esterification reaction was carried out first, and then the polymerization reaction. The molar ratio of pure terephthalic acid to ethylene glycol was 1:1.52, and the amount of the catalyst, based on the titanium element, was 10 ppm of the mass of PET. The final esterification temperature (i.e., the temperature at the end of esterification) was 255.6° C., and the esterification time was 3.60 h. The water output of esterification was 4030 mL. The polymerization time was 2.73 h, the polymerization vacuum was 55.4 Pa, the final polymerization temperature (i.e., the temperature at the end of polymerization, and the temperature at the start of polymerization is the final esterification temperature) was 278.5° C. When the stirring speed of the stirring shaft in a polymerization reactor was 600 rpm, the current value of the polymerization discharge was 2.55 A.

Example 2

Example 2 provides a nano-supported solid-phase titanium-based multi-metal catalyst, and uses the catalyst in the polymerization of PET. The specific steps are basically the same as those in Example 1, except that: in preparation of the catalyst, step 1) was omitted and the suspension of barium sulfate in ethylene glycol with a pH of 7.0 in step 2) was replaced with a suspension of 7-nanoporous alumina in water with a pH of 7.0, where the 7-nanoporous alumina had a particle size of 35 nm and a specific surface area is 240 $m^2/g$; and the conditions for polymerization reaction were adjusted, as shown in Table 1 below. The molar ratio of the slurry refers to the molar ratio of purified terephthalic acid to ethylene glycol.

Example 3

Example 3 provides a nano-supported solid-phase titanium-based multi-metal catalyst, and uses the catalyst in the polymerization of PET. The specific steps are basically the same as those in Example 1, except that: in preparation of the catalyst, step 1) was omitted and the suspension of barium sulfate in ethylene glycol with a pH of 7.0 in step 2) was replaced with a suspension of nanoporous alumina-zirconia powder in water with a pH of 7.0, where the nanoporous alumina-zirconia powder had a particle size of 60 nm and a specific surface area is 300 $m^2/g$; and the conditions for polymerization reaction were adjusted, as shown in Table 1 below.

Example 4

Example 4 provides a nano-supported solid-phase titanium-based multi-metal catalyst, and uses the catalyst in the polymerization of PET. The specific steps are basically the same as those in Example 1, except that: in preparation of the catalyst, step 1) was omitted and the suspension of barium sulfate in ethylene glycol with a pH of 7.0 in step 2) was replaced with a suspension of sharp feldspar in water with a pH of 7.0, where the sharp feldspar had a particle size of 40 nm and a specific surface area is 250 $m^2/g$; and the conditions for polymerization reaction were adjusted, as shown in Table 1 below.

Example 5

Example 5 provides a nano-supported solid-phase titanium-based multi-metal catalyst, and uses the catalyst in the polymerization of PET. The specific steps are basically the same as those in Example 1, except that: in preparation of the catalyst, step 1) was omitted and the suspension of barium sulfate in ethylene glycol with a pH of 7.0 in step 2) was replaced with a suspension of nanoporous silica in water with a pH of 7.0, where the nanoporous silica had a particle size of 45 nm and a specific surface area is 270 $m^2/g$; and the conditions for polymerization reaction were adjusted, as shown in Table 1 below.

Example 6

Example 6 provides a nano-supported solid-phase titanium-based multi-metal catalyst, and uses the catalyst in the polymerization of PET. The specific steps are basically the same as those in Example 1, except that: in preparation of the catalyst, step 1) was omitted and the suspension of barium sulfate in ethylene glycol with a pH of 7.0 in step 2) was replaced with a suspension of ultrafine porous molecular sieve in water with a pH of 7.0, where the ultrafine porous molecular sieve had a particle size of 50 nm and a specific surface area is 280 $m^2/g$; and the conditions for polymerization reaction were adjusted, as shown in Table 1 below.

Example 7

Example 7 provides a nano-supported solid-phase titanium-based multi-metal catalyst, and uses the catalyst in the polymerization of PET. The specific steps are basically the same as those in Example 1, except that: in preparation of the catalyst, the amount of the aqueous solution of the four metals and the amount of tetraisopropyl titanate were changed. The finally obtained catalyst included, in percent by weight, 86.0% of the carrier, 10.0% of the main active component in which the titanium content was 3.0%, and 4% of the secondary active component; in the secondary active component, the molar ratio of scandium to magnesium to cobalt to zinc was 5:1:1:1; and the conditions for polymerization reaction were adjusted, as shown in Table 1 below.

Example 8

Example 8 provides a nano-supported solid-phase titanium-based multi-metal catalyst, and uses the catalyst in the polymerization of PET. The specific steps are basically the same as those in Example 1, except that: in preparation of the catalyst, the amount of the aqueous solution of the four metals and the amount of tetraisopropyl titanate were changed. The finally obtained catalyst included, in percent by weight, 75.0% of the carrier, 10.0% of the main active component in which the titanium content was 3.0%, and 15% of the secondary active component; in the secondary active component, the molar ratio of scandium to magnesium to cobalt to zinc was 5:1:1:1; and the conditions for polymerization reaction were adjusted, as shown in Table 1 below.

Comparative Example 1

Comparative Example 1 provides a method for polymerization of PET, and the specific steps are as follows.

Pure terephthalic acid, ethylene glycol and an ethylene glycol antimony catalyst were added to a 70 L polymerization reactor for polymerization, where esterification reaction was carried out first, and then the polymerization reaction. The amount of the catalyst, based on the antimony element, was 210 ppm of the mass of PET. Specific conditions for polymerization reaction are shown in Table 1 below. It can be seen that by use of conventional ethylene glycol antimony as a catalyst, the esterification time and the polymerization time will be extended, and the final esterification temperature and the final polymerization temperature will be increased.

Comparative Example 2

Comparative Example 2 provides a method for polymerization of PET, and the specific steps are as follows.

Pure terephthalic acid, ethylene glycol and a tetrabutyl titanate catalyst were added to a 70 L polymerization reactor for polymerization, where esterification reaction was carried out first, and then the polymerization reaction. The amount of the catalyst, based on the titanium element, was 10 ppm of the mass of PET. Specific conditions for polymerization reaction are shown in Table 1 below. It can be seen that by use of tetrabutyl titanate as a catalyst, the esterification time and the polymerization time will be extended, and the final esterification temperature and the final polymerization temperature will be increased.

Comparative Example 3

Comparative Example 3 provides a method for polymerization of PET, and the specific steps are as follows.

Pure terephthalic acid, ethylene glycol and a titanium citrate catalyst imported from the UK were added to a 70 L polymerization reactor for polymerization, where esterification reaction was carried out first, and then the polymerization reaction. The amount of the catalyst, based on the titanium element, was 10 ppm of the mass of PET. Specific conditions for polymerization reaction are shown in Table 1 below. It can be seen that the use of titanium citrate as a catalyst will shorten the esterification time and polymerization time and reduce the final esterification temperature and the final polymerization temperature, compared with use of the conventional ethylene glycol antimony catalyst. The use of the catalyst of the present disclosure can achieve esterification and polymerization effects equivalent to those of titanium citrate.

Comparative Example 4

Comparative Example 4 provides a nano-supported solid-phase titanium-based multi-metal catalyst, and uses the catalyst in the polymerization of PET. The specific steps are basically the same as those in Example 1, except that: in preparation of the catalyst, no hydrated scandium sulfate was added in step 2). The finally obtained catalyst included, in percent by weight, 83.4% of the carrier, 6.6% of the main active component in which the titanium content was 2.0%, and 10% of the secondary active component; in the secondary active component, the molar ratio of magnesium to cobalt to zinc was 1:1:1; and in the polymerization reaction, the amount of the catalyst, based on the titanium element, was 10 ppm of the mass of PET. Specific conditions for polymerization reaction are shown in Table 1 below.

Comparative Example 5

Comparative Example 5 provides a nano-supported solid-phase titanium-based multi-metal catalyst, and uses the catalyst in the polymerization of PET. The specific steps are basically the same as those in Example 1, except that: in preparation of the catalyst, no magnesium sulfate was added in step 2). The finally obtained catalyst included, in percent by weight, 83.4% of the carrier, 6.6% of the main active component in which the titanium content was 2.0%, and 10% of the secondary active component; in the secondary active component, the molar ratio of scandium to cobalt to zinc was 5:1:1; and in the polymerization reaction, the amount of the catalyst, based on the titanium element, was 10 ppm of the mass of PET. Specific conditions for polymerization reaction are shown in Table 1 below.

Comparative Example 6

Comparative Example 6 provides a nano-supported solid-phase titanium-based multi-metal catalyst, and uses the catalyst in the polymerization of PET. The specific steps are basically the same as those in Example 1, except that: in preparation of the catalyst, no cobalt sulfate was added in step 2). The finally obtained catalyst included, in percent by weight, 83.4% of the carrier, 6.6% of the main active component in which the titanium content was 2.0%, and 10% of the secondary active component; in the secondary active component, the molar ratio of scandium to magnesium to zinc was 5:1:1; and in the polymerization reaction, the amount of the catalyst, based on the titanium element, was 10 ppm of the mass of PET. Specific conditions for polymerization reaction are shown in Table 1 below.

Comparative Example 7

Comparative Example 7 provides a nano-supported solid-phase titanium-based multi-metal catalyst, and uses the catalyst in the polymerization of PET. The specific steps are basically the same as those in Example 1, except that: in preparation of the catalyst, no zinc sulfate was added in step 2). The finally obtained catalyst included, in percent by weight, 83.4% of the carrier, 6.6% of the main active component in which the titanium content was 2.0%, and 10% of the secondary active component; in the secondary active component, the molar ratio of scandium to magnesium to cobalt was 5:1:1; and in the polymerization reaction, the amount of the catalyst, based on the titanium element, was 10 ppm of the mass of PET. Specific conditions for polymerization reaction are shown in Table 1 below.

TABLE 1

| | Molar ratio of slurry | Final esterification temperature/ °C. | Esterification time/h | Water output of esterification/ mL | Catalyst concentration | Polymerization time/h | Polymerization vacuum/Pa | Final polymerization temperature/°C. | Current value of polymerization discharge/A |
|---|---|---|---|---|---|---|---|---|---|
| Example 1 | 1:1.52 | 255.6 | 3.60 | 4030 | Ti, 10 ppm | 2.73 | 55.4 | 278.5 | 2.55 |
| Example 2 | 1:1.52 | 256.2 | 3.62 | 4050 | Ti, 10 ppm | 2.77 | 60.4 | 277.5 | 2.55 |
| Example 3 | 1:1.52 | 255.9 | 3.48 | 4015 | Ti, 10 ppm | 2.69 | 58.2 | 278.2 | 2.55 |
| Example 4 | 1:1.52 | 255.2 | 3.75 | 4022 | Ti, 10 ppm | 2.85 | 56.7 | 279.0 | 2.55 |
| Example 5 | 1:1.52 | 255.7 | 3.65 | 4000 | Ti, 10 ppm | 2.78 | 65.2 | 277.8 | 2.55 |
| Example 6 | 1:1.52 | 256.0 | 3.76 | 4052 | Ti, 10 ppm | 2.82 | 58.5 | 278.6 | 2.55 |
| Example 7 | 1:1.52 | 255.4 | 3.68 | 4033 | Ti, 10 ppm | 3.18 | 78.2 | 279.8 | 2.55 |
| Example 8 | 1:1.52 | 255.7 | 3.71 | 4025 | Ti, 10 ppm | 2.62 | 52.6 | 278.7 | 2.55 |
| Comparative Example 1 | 1:1.52 | 260.9 | 4.10 | 3960 | Sb, 210 ppm | 2.90 | 55.9 | 282.5 | 2.55 |
| Comparative Example 2 | 1:1.52 | 258.4 | 3.77 | 3978 | Ti, 10 ppm | 3.15 | 59.2 | 280.7 | 2.55 |
| Comparative Example 3 | 1:1.52 | 256.2 | 3.54 | 4215 | Ti, 10 ppm | 2.83 | 64.8 | 278.6 | 2.55 |
| Comparative Example 4 | 1:1.52 | 254.8 | 3.62 | 4017 | Ti, 10 ppm | 3.16 | 75.5 | 280.1 | 2.55 |
| Comparative Example 5 | 1:1.52 | 255.2 | 3.70 | 4002 | Ti, 10 ppm | 3.22 | 78.1 | 280.5 | 2.55 |
| Comparative Example 6 | 1:1.52 | 255.9 | 3.59 | 3990 | Ti, 10 ppm | 3.17 | 81.3 | 281.2 | 2.55 |
| Comparative Example 7 | 1:1.52 | 255.6 | 3.68 | 4122 | Ti, 10 ppm | 3.32 | 85.2 | 282.5 | 2.55 |

The polyester melts obtained in Examples 1-7 and Comparative Examples 1-7 were chipped, and various properties of the chips were tested using the GB/T14190-2017 standard. The results are shown in Table 2 below, where IV indicates intrinsic viscosity, measured in a mixed solvent of phenol and tetrachloroethane (v/v: 3:2), DEG, $H_2O$, ash, Fe, and agglomerated particles indicate the mass fraction contents of diethylene glycol, water, ash, Fe element, and agglomerated particles in the polyester, respectively, and MP indicates melting point.

TABLE 2

| | IV/ dL/g | DEG/ % | Terminal carboxyl content/ mol/t | MP/ °C. | $H_2O$/ % | Ash/ % | Fe/ mg/kg | ≥10 μm agglomerated particles/mg | hue value L | a | b |
|---|---|---|---|---|---|---|---|---|---|---|---|
| Example 1 | 0.646 | 2.225 | 7.96 | 252.9 | 0.53 | 0.01 | 1 | 0.0 | 58.07 | −1.69 | 4.10 |
| Example 2 | 0.642 | 2.324 | 7.57 | 253.5 | 0.77 | 0.01 | 1 | 0.0 | 55.25 | −1.83 | 0.44 |
| Example 3 | 0.640 | 2.269 | 7.83 | 253.1 | 0.49 | 0.01 | 3 | 0.0 | 58.36 | −0.93 | 3.03 |
| Example 4 | 0.634 | 2.382 | 7.31 | 252.1 | 0.57 | 0.01 | 1 | 0.0 | 58.07 | 2.07 | 3.95 |
| Example 5 | 0.645 | 2.367 | 7.57 | 253.2 | 0.56 | 0.01 | 4 | 0.0 | 56.56 | 1.50 | 3.23 |

TABLE 2-continued

| | IV/ dL/g | DEG/ % | Terminal carboxyl content/ mol/t | MP/ °C. | H₂O/ % | Ash/ % | Fe/ mg/kg | ≥10 μm agglomerated particles/mg | hue value L | a | b |
|---|---|---|---|---|---|---|---|---|---|---|---|
| Example 6 | 0.639 | 2.275 | 8.32 | 253.1 | 0.65 | 0.01 | 3 | 0.0 | 56.21 | −1.81 | 4.25 |
| Example 7 | 0.642 | 2.832 | 10.55 | 252.6 | 0.58 | 0.04 | 5 | 0.0 | 53.15 | −0.95 | 5.02 |
| Example 8 | 0.638 | 1.785 | 7.62 | 257.5 | 0.62 | 0.00 | 1 | 0.0 | 58.22 | −1.78 | 1.66 |
| Comparative Example 1 | 0.642 | 1.890 | 15.89 | 256.8 | 0.45 | 0.01 | 1 | 0.0 | 53.83 | −0.98 | 3.89 |
| Comparative Example 2 | 0.638 | 2.165 | 13.62 | 253.6 | 0.58 | 0.02 | 4 | 0.0 | 54.36 | −0.57 | 4.28 |
| Comparative Example 3 | 0.636 | 3.322 | 25.35 | 251.5 | 0.62 | 0.05 | 6 | 0.1 | 53.62 | 0.26 | 6.55 |
| Comparative Example 4 | 0.640 | 2.670 | 20.22 | 252.9 | 0.49 | 0.06 | 1 | 0.2 | 52.01 | 0.16 | 7.65 |
| Comparative Example 5 | 0.643 | 2.756 | 22.18 | 253.0 | 0.55 | 0.04 | 5 | 0.3 | 50.58 | 0.35 | 7.93 |
| Comparative Example 6 | 0.637 | 2.822 | 24.35 | 252.5 | 0.53 | 0.04 | 5 | 0.2 | 51.36 | 0.22 | 19.52 |
| Comparative Example 7 | 0.635 | 2.693 | 23.31 | 253.6 | 0.60 | 0.07 | 7 | 0.6 | 49.68 | 0.31 | 10.11 |

The polyester melts obtained in Examples 1-7 and Comparative Examples 1-7 were spun in a spinning manifold. The spinning process parameters and spinning conditions are shown in Table 3 below, and the obtained polyester fibers were FDY with a specification of 66 dtex/36f.

TABLE 3

| | Specification | Winding up speed | Screw zone 1 temperature/ °C. | Screw zone 2 temperature/ °C. | Screw zone 3 temperature/ °C. | Spinning manifold temperature/ °C. | Spinning condition |
|---|---|---|---|---|---|---|---|
| Example 1 | 66/36 | 4100 m/s | 270 | 280 | 280 | 277 | The pressure after filtration is stable and the spinning effect is good. |
| Example 2 | 66/36 | 4100 m/s | 270 | 280 | 280 | 277 | The pressure after filtration is stable and the spinning effect is good. |
| Example 3 | 66/36 | 4100 m/s | 270 | 280 | 280 | 277 | The pressure after filtration is stable and the spinning effect is good. |
| Example 4 | 66/36 | 4100 m/s | 270 | 280 | 280 | 277 | The pressure after filtration is stable and the spinning effect is good. |
| Example 5 | 66/36 | 4100 m/s | 270 | 280 | 280 | 277 | The pressure after filtration is stable and the spinning effect is good. |
| Example 6 | 66/36 | 4100 m/s | 270 | 280 | 280 | 277 | The pressure after filtration is stable and the spinning effect is good. |
| Example 7 | 66/36 | 4100 m/s | 270 | 281 | 280 | 278 | The pressure after filtration is stable and the spinning effect is average. |
| Example 8 | 66/36 | 4100 m/s | 270 | 280 | 280 | 277 | The pressure after filtration is stable and the spinning effect is good. |
| Comparative Example 1 | 66/36 | 4100 m/s | 276 | 285 | 283 | 283 | The pressure after filtration is stable and the spinning effect is good. |
| Comparative Example 2 | 66/36 | 4100 m/s | 270 | 280 | 280 | 277 | The pressure after filtration is stable and the spinning effect is average. |
| Comparative Example 3 | 66/36 | 4100 m/s | 270 | 280 | 280 | 277 | The pressure after filtration fluctuates and the spinning effect is average. |
| Comparative Example 4 | 66/36 | 4100 m/s | 270 | 281 | 283 | 280 | The pressure after filtration fluctuates and the spinning effect is average. |

TABLE 3-continued

| | Specification | Winding up speed | Screw zone 1 temperature/ °C. | Screw zone 2 temperature/ °C. | Screw zone 3 temperature/ °C. | Spinning manifold temperature/ °C. | Spinning condition |
|---|---|---|---|---|---|---|---|
| Comparative Example 5 | 66/36 | 4100 m/s | 270 | 281 | 283 | 280 | The pressure after filtration fluctuates and the spinning effect is average. |
| Comparative Example 6 | 66/36 | 4100 m/s | 270 | 282 | 283 | 280 | The pressure after filtration fluctuates and the spinning effect is average. |
| Comparative Example 7 | 66/36 | 4100 m/s | 270 | 280 | 282 | 280 | The pressure after filtration fluctuates and the spinning effect is average. |

During the spinning process, the spinning viscosity drop performance is shown in Table 4 below, where melt viscosity refers to the viscosity during spinning, melt viscosity drop refers to the difference between wet chip viscosity and melt viscosity, and the following viscosities are all intrinsic viscosities, all in dL/g, measured in a mixed solvent of phenol and tetrachloroethane (v/v: 3:2).

TABLE 4

| | Chip type | Wet chip viscosity | Dry chip viscosity | Melt viscosity | Melt viscosity drop | Oil-free filament viscosity | Oil-free filament viscosity drop |
|---|---|---|---|---|---|---|---|
| Example 1 | Lustrous | 0.646 | 0.648 | 0.625 | 0.021 | 0.622 | 0.026 |
| Example 2 | Lustrous | 0.642 | 0.645 | 0.619 | 0.023 | 0.614 | 0.028 |
| Example 3 | Lustrous | 0.640 | 0.642 | 0.615 | 0.025 | 0.612 | 0.028 |
| Example 4 | Lustrous | 0.634 | 0.635 | 0.612 | 0.022 | 0.610 | 0.025 |
| Example 5 | Lustrous | 0.645 | 0.648 | 0.619 | 0.026 | 0.617 | 0.028 |
| Example 6 | Lustrous | 0.639 | 0.643 | 0.615 | 0.024 | 0.611 | 0.028 |
| Example 7 | Lustrous | 0.642 | 0.643 | 0.617 | 0.026 | 0.615 | 0.028 |
| Example 8 | Lustrous | 0.638 | 0.639 | 0.621 | 0.018 | 0.617 | 0.022 |
| Comparative Example 1 | Lustrous | 0.642 | 0.641 | 0.622 | 0.020 | 0.619 | 0.023 |
| Comparative Example 2 | Lustrous | 0.638 | 0.636 | 0.610 | 0.028 | 0.606 | 0.032 |
| Comparative Example 3 | Lustrous | 0.636 | 0.633 | 0.607 | 0.029 | 0.602 | 0.034 |
| Comparative Example 4 | Lustrous | 0.640 | 0.642 | 0.615 | 0.027 | 0.612 | 0.030 |
| Comparative Example 6 | Lustrous | 0.643 | 0.643 | 0.613 | 0.030 | 0.608 | 0.035 |
| Comparative Example 6 | Lustrous | 0.637 | 0.638 | 0.609 | 0.029 | 0.603 | 0.035 |
| Comparative Example 7 | Lustrous | 0.635 | 0.636 | 0.614 | 0.022 | 0.609 | 0.027 |

The physical and chemical properties of the fiber products obtained by spinning were tested according to the GBT8960-2015 test standard. The results are shown in Table 5 below, where 10% strength refers to the force required to stretch the fiber by 10%.

TABLE 5

| | Linear density/ dtex | Strength cN/ dtex | Elongation/ % | 10% strength/ cN/dtex | Interlacing point | Boiling water shrinkage rate/ % | Oil content/ % |
|---|---|---|---|---|---|---|---|
| Example 1 | 66.2 | 3.9 | 40.5 | 151.0 | 8.0 | 8.4 | 1.0 |
| Example 2 | 66.9 | 3.9 | 36.9 | 161.0 | 8.2 | 8.7 | 1.0 |
| Example 3 | 66.6 | 4.0 | 37.3 | 162.0 | 7.9 | 8.2 | 1.0 |
| Example 4 | 66.6 | 3.9 | 39.2 | 157.0 | 5.0 | 8.5 | 1.0 |
| Example 5 | 66.6 | 3.9 | 37.5 | 164.0 | 8.0 | 8.7 | 1.0 |
| Example 6 | 66.4 | 4.0 | 34.2 | 171.0 | 7.8 | 8.4 | 1.0 |
| Example 7 | 66.2 | 3.9 | 36.3 | 158.0 | 7.7 | 8.5 | 1.0 |
| Example 8 | 66.5 | 4.0 | 36.5 | 168.0 | 8.1 | 8.2 | 1.0 |

TABLE 5-continued

|  | Linear density/ dtex | Strength cN/ dtex | Elongation/ % | 10% strength/ cN/dtex | Interlacing point | Boiling water shrinkage rate/ % | Oil content/ % |
|---|---|---|---|---|---|---|---|
| Comparative Example 1 | 67.3 | 4.0 | 36.7 | 161.0 | 8.0 | 8.7 | 1.0 |
| Comparative Example 2 | 66.5 | 3.8 | 30.3 | 167.0 | 8.3 | 8.2 | 1.0 |
| Comparative Example 3 | 66.8 | 3.7 | 42.4 | 155.0 | 8.0 | 8.5 | 1.0 |
| Comparative Example 4 | 66.3 | 3.8 | 37.2 | 158.0 | 8.5 | 8.7 | 1.0 |
| Comparative Example 5 | 66.0 | 3.8 | 36.6 | 155.0 | 7.8 | 8.9 | 1.0 |
| Comparative Example 6 | 66.7 | 3.7 | 36.9 | 155.0 | 8.2 | 8.4 | 1.0 |
| Comparative Example 7 | 65.8 | 3.9 | 35.7 | 162.0 | 8.5 | 8.6 | 1.0 |

It can be seen that the use of the specific nano-supported solid-phase titanium-based multi-metal catalyst of the present disclosure, compared with use of conventional titanium-based or antimony-based catalysts, or catalysts in which the secondary active component does not contain the four metal oxides of the present disclosure, can better inhibit the hydrolysis of the titanium-based catalyst during the polymerization process, inhibit the occurrence of side reactions, and improve the hue and spinning properties of the polyester product.

The above embodiments are only for illustrating the technical concept and features of the disclosure, and their purpose is to enable people familiar with this technology to understand the content of the disclosure and implement it accordingly, but not to limit the scope of the disclosure. Any equivalent changes or modifications made according to the spirit of the disclosure should fall within the scope of the disclosure.

What is claimed is:

1. A method for preparing a nano-supported catalyst, the catalyst comprising a carrier and an active component, the active component comprising a main active component and a secondary active component, wherein, the carrier is a silica-coated modified porous inorganic material; the preparation method comprising the following steps: precipitating a reaction of a suspension of the carrier, a water-soluble scandium salt, a water-soluble magnesium salt, a water-soluble cobalt salt, a water-soluble zinc salt and a water-soluble hydroxide, filtering and heating treatment so that the carrier is loaded with the secondary active component; reacting a titanium source with an acid to obtain a reaction mixture; reacting the suspension of the carrier loaded with the secondary active component with the reaction mixture to obtain a catalyst precursor; and reacting the catalyst precursor with a silicate and water so that the carrier is loaded with the main active component, thereby obtaining the nano-supported catalyst; the porous inorganic material has a particle size of 20-70 nm and a specific surface area of 220-400 m$^2$/g; the porous inorganic material is one or more of molecular sieve, sharp feldspar, nanoporous alumina, nanoporous alumina-zirconia, porous silica and nanoporous barium sulfate; a mass ratio of the active component to the carrier is 11.3-25.0:75.0-88.7; a molar ratio of the main active component to the secondary active component is 3.3-10.0:8-15; a molar ratio of the water-soluble scandium salt to the water-soluble magnesium salt to the water-soluble cobalt salt to the water-soluble zinc salt is 0.1-3.0:0.5-2.5:0.1-1.0:0.5-3.0.

2. The method for preparing a nano-supported catalyst according to claim 1, wherein, the nano-supported catalyst has a particle size of 80-160 nm.

3. The method for preparing a nano-supported catalyst according to claim 1, wherein, the porous inorganic material has a particle size of 25-40 nm and a specific surface area of 270-350 m$^2$/g.

4. The method for preparing a nano-supported catalyst according to claim 1, characterized in that, the water-soluble scandium salt, the water-soluble magnesium salt, the water-soluble cobalt salt, and the water-soluble zinc salt are respectively selected from sulfates, acetates, or chlorides of the corresponding metal elements.

5. The method for preparing a nano-supported catalyst according to claim 1, wherein, the acid is one or more of formic acid, acetic acid, propionic acid, oxalic acid, malonic acid, succinic acid, citric acid, and polyphosphoric acid.

6. The method for preparing a nano-supported catalyst according to claim 1, wherein, a mass ratio of the titanium source to the acid is 1:0.5-2.0.

7. The method for preparing a nano-supported catalyst according to claim 1, wherein, the water-soluble hydroxide is one or two of sodium hydroxide, potassium hydroxide.

8. The method for preparing a nano-supported catalyst according to claim 1, wherein, the titanium source is one or more of tetraisopropyl titanate, tetrabutyl titanate, and titanium tetrachloride.

9. The method for preparing a nano-supported catalyst according to claim 1, wherein, the silicate is one or more of tetraethyl silicate, tetrabutyl silicate, and tetrapropyl silicate.

10. The method for preparing a nano-supported catalyst according to claim 1, wherein, a mass ratio of the silicate to the titanium source is 1:0.2-0.5.

11. The method for preparing a nano-supported catalyst according to claim 1, wherein, the water-soluble scandium salt, the water-soluble magnesium salt, the water-soluble cobalt salt, and the water-soluble zinc salt are added dropwise to the suspension of the carrier in the form of an aqueous solution; the water-soluble hydroxide is added dropwise to the suspension of the carrier in the form of an aqueous solution; and in the preparation method, the addition of the water-soluble scandium salt, the water-soluble magnesium salt, the water-soluble cobalt salt, and the water-soluble zinc salt is controlled to be simultaneous with the addition of the water-soluble hydroxide.

12. The method for preparing a nano-supported catalyst according to claim 11, wherein, the molar concentration of the water-soluble scandium salt in the aqueous solution is 0.1-3.0 mol/L; and/or, the molar concentration of the water-soluble magnesium salt in the aqueous solution is 0.5-2.5 mol/L; and/or, the molar concentration of the water-soluble cobalt salt in the aqueous solution is 0.1-1.0 mol/L; and/or, the molar concentration of the water-soluble zinc salt in the aqueous solution is 0.5-3.0 mol/L; and/or, the molar concentration of the water-soluble hydroxide in its aqueous solution is 0.1 to 2.0 mol/L.

13. The method for preparing a nano-supported catalyst according to claim 1, wherein, the precipitating reaction is carried out at a pH of 10-12; and/or, the precipitating reaction is carried out for 8-11 h; and/or, the precipitating reaction is carried out at a temperature of 70-130° C.

14. The method for preparing a nano-supported catalyst according to claim 1, wherein, the heating treatment is carried out at a temperature of 290-310° C.; and/or, the heating treatment is carried out for 2-6 h.

15. The method for preparing a nano-supported catalyst according to claim 1, wherein, the preparation method comprising the following steps: 1) heating the suspension of the carrier to 60-90° C., adding a mixed aqueous solution of the water-soluble scandium salt, the water-soluble magnesium salt, the water-soluble cobalt salt and the water-soluble zinc salt and the aqueous solution of the water-soluble hydroxide dropwise to the suspension of the carrier with stirring for precipitation reaction, and after the addition, heating the suspension to 110-130° C. to continue the reaction, adjusting the pH to neutral, filtering, drying, heating treatment, and crushing so that the carrier is loaded with the secondary active component; 2) reacting the titanium source with the acid to obtain a reaction mixture; 3) dispersing the carrier loaded with the secondary active component in ethylene glycol, adding the reaction mixture dropwise to the ethylene glycol for reaction to obtain a catalyst precursor; and 4) adding the silicate and water to the catalyst precursor for reaction, and then removing the acid and water, thereby obtaining the nano-supported catalyst.

16. The method for preparing a nano-supported catalyst according to claim 15, wherein, the preparation method further comprising steps of dispersing the porous inorganic material in ethylene glycol or water, adding tetraethyl orthosilicate or sodium silicate and the aqueous solution of sodium hydroxide to the ethylene glycol or water for hydrolysis reaction, filtering and drying to obtain the carrier.

* * * * *